United States Patent [19]

Christman et al.

[11] 4,438,248

[45] Mar. 20, 1984

[54] TRIMERIZATION CATALYSTS AND ORGANO-MERCURY COMPOUNDS AS CO-CATALYSTS FOR THE PREPARATION OF NONCELLULAR POLYURETHANE ELASTOMERS

[75] Inventors: Donald L. Christman, Grosse Ile; Bernard A. Merkl, Riverview, both of Mich.

[73] Assignee: BASF Wyandotte Corporation, Wyandotte, Mich.

[21] Appl. No.: 451,080

[22] Filed: Dec. 20, 1982

[51] Int. Cl.$^3$ .............................................. C08G 18/22
[52] U.S. Cl. ........................................ 528/57; 528/55
[58] Field of Search ............... 528/55, 57; 521/902

[56] References Cited

U.S. PATENT DOCUMENTS

| | | | |
|---|---|---|---|
| 2,692,204 | 10/1954 | Nowak | 106/18.34 |
| 3,419,509 | 12/1968 | Willett | 528/55 |
| 3,583,945 | 6/1971 | Robins | 528/55 |
| 3,642,044 | 2/1972 | Fertig et al. | 528/55 |
| 3,745,133 | 7/1973 | Commundle et al. | 521/156 |
| 3,767,743 | 10/1973 | Hostettler et al. | 528/55 |
| 3,896,052 | 7/1975 | Lockwood et al. | 521/128 |
| 3,899,443 | 8/1975 | Reymore et al. | 521/78 |
| 3,903,018 | 9/1975 | Kolakowski et al. | 521/114 |
| 3,927,053 | 12/1975 | Gallagher et al. | 528/79 |
| 3,954,684 | 5/1976 | Farrissey et al. | 521/114 |
| 4,101,465 | 7/1978 | Lockwood et al. | 521/118 |

*Primary Examiner*—H. S. Cockeram
*Attorney, Agent, or Firm*—Joseph D. Michaels; David L. Hedden

[57] ABSTRACT

The subject matter of this invention relates to the preparation of polyurethanes. It is particularly concerned with the use of organo-mercury compounds and trimerization catalysts as co-catalysts in the preparation of noncellular polyurethane elastomers.

6 Claims, No Drawings

TRIMERIZATION CATALYSTS AND ORGANO-MERCURY COMPOUNDS AS CO-CATALYSTS FOR THE PREPARATION OF NONCELLULAR POLYURETHANE ELASTOMERS

BACKGROUND OF THE INVENTION

1. Field of the Invention

This invention relates to the preparation of noncellular polyurethane elastomers. It is particularly concerned with the use of trimerization catalysts and organo-mercury compounds as co-catalysts in the preparation of noncellular polyurethane elastomers.

2. Description of the Prior Art

It is known to prepare polyurethane elastomers by the reaction of an organic polyisocyanate with an organic compound containing at least two active hydrogens as determined by the well-known Zerewitinoff method. In order to prepare noncellular polyurethane elastomers, the reaction is carried out in the presence of a delayed reaction catalyst in the absence of a blowing agent. Typical delayed reaction catalysts are organo-mercury compounds such as those described in U.S. Pat. Nos. 3,583,945; 3,927,053; 2,692,204; and 3,642,044. Delayed reaction catalysts are used because it is known that any water in the system (any system will have some water in it even though none is added) will react with the organic polyisocyanate and cause the formation of carbon dioxide. Therefore, this reaction must be minimized if a noncellular elastomer is wanted.

SUMMARY OF THE INVENTION

This invention relates to a process for preparing noncellular polyurethane elastomers which comprises reacting in the absence of a blowing agent an organic polyisocyanate with an organic compound containing at least two active hydrogen atoms as determined by the Zerewitinoff method in the presence of a catalytically effective amount of an organo-mercuric compound and a catalyst which is predominantly a trimerization catalyst.

The addition of the trimerization catalyst provides faster hardening times and faster gel times.

DESCRIPTION OF THE PREFERRED EMBODIMENTS

Organo-mercuric compounds having a catalytic effect in the reaction of organic polyisocyanates and compounds having active hydrogen atoms are well known in the art. U.S. Pat. Nos. 3,583,945; 3,927,053; 2,692,204; and 3,642,044, which are hereby incorporated by reference, disclose organo-mercuric compounds which can be used as catalysts in the preparation of polyurethanes. Any of these compounds can be employed in accordance with this invention.

The trimerization catalyst employed can be any catalyst known to those skilled in the art which will catalyze the trimerization of an organic isocyanate compound to form the isocyanurate moiety. The trimerization catalysts used are those which predominantly promote trimerization rather than the formation of urethane linkages. For typical isocyanate trimerization catalysts see *The Journal of Cellular Plastics*, November/December 1975, page 329; U.S. Pat. Nos. 3,745,133; 3,896,052; 3,899,443; 3,903,018; 3,954,684; and 4,101,465, the disclosures of these references being hereby incorporated by reference herein.

Typical catalyst classes are the glycine salts and tertiary amine trimerization catalysts and alkali metal carboxylic acid salts disclosed in the above patents and mixtures of the various types of catalysts.

The preferred trimerization catalyst, based upon cost, is potassium 2-ethylhexanoate.

The total amount of catalyst employed is from about 0.15 to about 1.00 parts, preferably from about 0.25 to about 0.65 parts by weight, based upon 100 parts by weight of active hydrogen atom containing compound. The weight ratio of organo-mercuric catalyst to trimerization catalyst is from about 1:1 to about 5:1, preferably about 3:1.

Noncellular polyurethane elastomers are prepared by mixing an organic polyisocyanate with a compound having at least two active hydrogen atoms as determined by the well-known Zerewitinoff test as described in Kohler, *Journal of the American Chemical Society*, Vol. 49, p. 3181 (1927). These compounds and their methods of preparation are well known in the art. The co-catalysts are added to the compound having the active hydrogen atoms before it is reacted with the organic polyisocyanate.

The organic polyisocyanates used in the preparation of polyurethanes in the process of the subject invention correspond to the formula:

R"(NCO)z wherein R" is a polyvalent organic radical which is either aliphatic, arylalkyl, alkylaryl, aromatic or mixtures thereof, and z is an integer which corresponds to the valence of R" and is at least two. Representative of the organic polyisocyanates contemplated herein includes, for example, the aromatic diisocyanates, such as 2,4-toluene diisocyanate, 2,6-toluene diisocyanate, mixtures of 2,4- and 2,6-toluene diisocyanate, crude toluene diisocyanate, methylene diphenyl diisocyanate, crude methylene diphenyl diisocyanate and the like; the aromatic triisocyanates such as 4,4',4"-triphenylmethane triisocyanate, 2,4,6-toluene triisocyanates; the aromatic tetraisocyanates such as 4,4'-dimethyldiphenylmethane-2,2',5,5'-tetraisocyanate, and the like; arylalkyl polyisocyanates, such as xylene diisocyanate; aliphatic polyisocyanates, such as hexamethylene-1,6-diisocyanate, lysine diisocyanate methylester and the like; and mixtures thereof. Other organic polyisocyanates include polymethylene polyphenyl polyisocyanate, hydrogenated methylene diphenylisocyanate, m-phenylene diisocyanate, naphthylene-1,5-diisocyanate, 1-methoxyphenylene-2,4-diisocyanate, 4,4'-biphenylene diisocyanate, 3,3'-dimethoxy-4,4'-biphenyl diisocyanate, 3,3'-dimethyl-4,4'-biphenyl diisocyanate, and 3,3'-dimethyldiphenylmethane-4,4'-diisocyanate. These polyisocyanates are prepared by conventional methods known in the art such as the phosgenation of the corresponding organic amine. Included within the usable isocyanates are modifications of the above isocyanates which contain carbodiimide, allophanate, urea or isocyanurate structures. Prepolymers and quasi-prepolymers may also be employed as the organic polyisocyanate. The useful prepolymers are isocyanate-terminated reaction products of an organic polyisocyanate and an active hydrogen compound such as a polyol. The quasi-prepolymers are solutions of prepolymers in an excess of organic polyisocyanate and are prepared by reacting an excess of organic polyisocyanate or mixture thereof with a minor amount of an active hydrogen compound, preferably a polyol. Generally, the quasi-prepolymer will have a free isocyanate content of about 20 percent to 40 percent by weight. Active hydrogen compounds are those compounds which have in their structure reactive hydrogens as determined by the Zerewitinoff test, as described by Kohler in the Journal of the American Chemical Society, Vol. 49, page 3181 (1927). These compounds and their method of preparation are well known in the art.

Preferably used as the organic polyisocyanate are mixtures of methylenediphenyl diisocyanate and polymethylene polyphenylene polyisocyanates having a functionality greater than 2.

In preparing the noncellular polyurethane elastomers, the use of any one specific active hydrogen compound is not critical hereto, rather any such compound can be employed herein to react with the polyisocyanate. Suitable active hydrogen-containing functional groups as determined by the Zerewitinoff method which are reactive with an isocyanate group include —OH, —NH—, —COOH, and —SH. Examples of suitable types of organic compounds containing at least two active hydrogen-containing groups which are reactive with an isocyanate group are hydroxyl-terminated polyesters, polyalkylene ether polyols, hydroxyl-terminated polyurethane polymers, polyhydric polythioethers, alkylene oxide adducts of phosphorus-containing acids, polyacetals, aliphatic polyols, aliphatic thiols including alkane, alkene and alkyne thiols having two or more —SH groups; diamines including both aromatic, aliphatic and heterocyclic diamines as well as mixtures thereof. Compounds which contain two or more different groups within the above-defined classes may also be used in accordance with the process of the present invention such as, for example, amino alcohols which contain an amino group and a hydroxyl group. Also, compounds may be used which contain one —SH group and one —OH group as well as those which contain an amino group and a —SH group.

Any suitable hydroxy-terminated polyester may be used such as are obtained, for example, from polycarboxylic acids and polyhydric alcohols. Any suitable polycarboxylic acid may be used such as oxalic acid, malonic acid, succinic acid, glutaric acid, adipic acid, pimelic acid, suberic acid, azelaic acid, sebacic acid, brassylic acid, thapsic acid, maleic acid, fumaric acid, glutaconic acid, $\beta$-hydromuconic acid, $\alpha$-hydromuconic acid, $\alpha$-butyl-$\alpha$-ethyl-glutaric acid, $\alpha,\beta$-diethylsuccinic acid, isophthalic acid, terephthalic acid, hemimellitic acid, and 1,4-cyclohexanedicarboxylic acid. Any suitable polyhydric alcohol, including both aliphatic and aromatic, may be used such as ethylene glycol, 1,3-propanediol, propylene glycol, 1,4-butanediol, 1,3-butanediol, 1,2-butylene glycol, 1,5-pentanediol, 1,4-pentanediol, 1,3-pentanediol, 1,6-hexanediol, 1,7-heptanediol, glycerol, 1,1,1-trimethylolpropane, 1,1,1-trimethylolethane, hexane-1,2,6-triol, $\alpha$-methyl glucoside, pentaerythritol, and sorbitol. Also included within the term "polyhydric alcohol" are compounds derived from phenol such as 2,2-bis(4-hydroxyphenyl)propane, commonly known as Bisphenol A.

The hydroxy-terminated polyester may also be a polyester amide such as is obtained by including some amine or amino alcohol in the reactants for the preparation of the polyesters. Thus, polyester amides may be obtained by condensing an amino alcohol such as ethanolamine with the polycarboxylic acids set forth above, or they may be made using the same components that make up the hydroxy-terminated polyester with only a portion of the components being a diamine such as ethylenediamine.

Any suitable polyoxyalkylene polyol may be used such as the polymerization product of an epoxide with a polyhydric alcohol. Any suitable polyhydric alcohol may be used such as those disclosed above for use in the preparation of the hydroxy-terminated polyesters. Any suitable epoxide may be used such as ethylene oxide, propylene oxide, butylene oxide, amylene oxide, and heteric or block copolymers of these oxides. The polyalkylene polyether polyols may be prepared from other starting materials such as tetrahydrofuran and epoxide-tetrahydrofuran copolymers; epihalohydrins such as epichlorohydrin; as well as aralkylene oxide such as styrene oxide. The polyoxyalkylene polyether polyols may have either primary or secondary hydroxyl groups and, preferably, are polyethers prepared from alkylene oxides having from two to six carbon atoms such as polyethylene ether glycols, polypropylene ether glycols, and polybutylene ether glycols. The polyoxyalkylene polyether polyols may be prepared by any known process such as, for example, the process disclosed by Wurtz in 1859 and Encyclopedia of Chemical Technology, Vol. 7, pp. 257-262, published by Interscience Publishers, Inc. (1951) or in U.S. Pat. No. 1,922,459. Alkylene oxide adducts of Mannich condensation products are also useful in the invention.

The reactive polyol medium generally has a molecular weight of from about 500 to 4000 and a hydroxyl number ranging from about 30 to about 600.

Also, polyols containing ester groups can be employed in the subject invention. These polyols are prepared by the reaction of an alkylene oxide with an organic dicarboxylic acid anhydride and a compound containing an active hydrogen atom. A more comprehensive discussion of these polyols and their methods of preparation can be found in U.S. Pat. Nos. 3,585,185, 3,639,541 and 3,639,542.

Epoxide adducts of acids of phosphorus which may be used include those neutral adducts prepared from the alkylene oxides disclosed above for use in the preparation of polyalkylene polyether polyols. Acids of phosphorus which may be used are acids having a $P_2O_5$ equivalency of from about 72 percent to about 95 percent. The phosphoric acids are preferred.

Any suitable hydroxy-terminated polyacetal may be used such as, for example, the reaction product of formaldehyde or other suitable aldehyde with a dihydric alcohol or an epoxide such as those disclosed above.

Any suitable aliphatic thiol including alkane thiols containing at least two —SH groups may be used such as 1,2-ethanedithiol, 1,2-propanedithiol, 1,3-propanedithiol, and 1,6-hexanedithiol; alkenethiols such as 2-butene-1,4-dithiol, and alkynethiols such as 3-hexyne-1,6-dithiol.

Any suitable polyamine may be used including aromatic polyamines such as methylene dianiline, polyaryl polyalkylene polyamine (crude methylene dianiline), p-aminoaniline, 1,5-diaminonaphthalene, and 2,4-diaminotoluene; aliphatic polyamines such as ethylenediamine, 1,3-propylenediamine; 1,4-butylenediamine, and 1,3-butylenediamine, as well as substituted secondary derivatives thereof.

In addition to the above hydroxyl-containing compounds, other compounds which may be employed include graft polyols. These polyols are prepared by the in situ polymerization product of a vinyl monomer in a reactive polyol medium and in the presence of a free radical initiator. The reaction is generally carried out at a temperature ranging from about 40° C. to 150° C. A more comprehensive discussion of the graft polyols and their method of preparation can be found in U.S. Pat. Nos. 3,383,351, 3,304,273, 3,652,639, and 3,823,201, the disclosures of which are hereby incorporated by reference.

The process described in this invention is useful for preparing noncellular polyurethanes because any side reaction between the organic polyisocyanate with water is inhibited. When noncellular polyurethanes are prepared, the ratio of isocyanate groups of the organic polyisocyanate to the active hydrogens of the active hydrogen-containing compounds is from about 1.0:1.0 to about 1.2:1.0. Inorganic fillers and other additives such as surfactants may also be included in the polyurethane formulations.

Following are specific, non-limiting examples which are provided to illustrate the enumerated principles described herein. All parts are by weight and all temperatures are in centigrade unless otherwise specified. In the examples and table which follow, the following abbreviations are used:

F—a filler compound of calcined clay sold under the trademark SATINTONE NO. 2.
IO—yellow iron oxide pigment.
Polyol A—a polyol having an average molecular weight of 2,000 prepared by oxypropylating propylene glycol.
MC—a phenyl mercury carboxylate sold under the trademark COCURE ®30.
MDI—crude methylene diphenyl diisocyanate, a product which results from the phosgenation of an aniline-formaldehyde condensation product and which has a functionality of from 2 to 3.
DMP-30—2,4,6-tris(dimethylamino methyl phenol).
T-45—potassium 2-ethylhexanoate.

COMPARISON EXAMPLE

The following reactants (hereinafter referred to as Component A) were mixed with a high shear laboratory mixer in a reaction vessel: 126.7 parts of Polyol A, 1.2 parts of IO, 57.0 parts of F, and 0.35 percent by weight, based on the weight of the polyol, of MC.

A noncellular polyurethane elastomer was prepared by adding component A to a reaction vessel containing 23.4 parts of MDI. The resulting isocyanate index was 120. The hardness of the resulting elastomer was measured periodically over a 12-day period. These measurements are given in the Table which follows along with the time needed for the elastomers to gel, i.e., reach a viscosity of 200,000 cps using a Brookfield No. 7 spindle.

EXAMPLES 1–7

In Examples 1–7 the procedure of the comparison example was followed except that various trimerization catalysts were used in addition to MC. The specific catalysts used with the amounts and the results are shown in the Table which follows.

TABLE

| Example | Catalyst | | | Gel Time | Hardness, Shore A, Instant Days | | | | | | | | | | | |
|---|---|---|---|---|---|---|---|---|---|---|---|---|---|---|---|---|
| | MC | T-45 | DMP-30 | Min:Sec | 1 | 2 | 3 | 4 | 5 | 6 | 7 | 8 | 9 | 10 | 11 | 12 |
| Comparison | 0.35 | — | — | 20:23 | 52 | 54 | 55 | 56 | — | — | — | 60 | 61 | 62 | 62 | — |
| 1 | 0.30 | 0.10 | — | 19:15 | 59 | — | — | 62 | 62 | 63 | 63 | 63 | 63 | — | 63 | 64 |
| 2 | 0.25 | 0.15 | — | 24:22 | 59 | — | — | 62 | 62 | 62 | 63 | 63 | 63 | — | 63 | 63 |
| 3 | 0.30 | 0.20 | — | 15:20 | 62 | 63 | 63 | 64 | — | — | 64 | 64 | 64 | 64 | — | — |
| 4 | 0.25 | 0.20 | — | 20:30 | 57 | 60 | 60 | 60 | — | — | 61 | 61 | 60 | 60 | — | — |
| 5 | 0.35 | 0.20 | — | 10:08 | 61 | — | — | 64 | 65 | 65 | 65 | 65 | — | — | 65 | — |
| 6 | 0.35 | 0.20 | 0.10 | 11:22 | 61 | 64 | — | — | 64 | 65 | 64 | 64 | 64 | — | — | 65 |
| 7 | 0.35 | 0.10 | 0.10 | 13:28 | 53 | 58 | — | — | 62 | 62 | 63 | 63 | 63 | — | — | 64 |

The results in this table illustrate that the use of a trimerization catalyst along with an organo-mercuric compound decreases the time needed for the elastomer to harden.

The embodiments of the invention in which an exclusive privilege or property is claimed are defined as follows:

1. A process for preparing a noncellular polyurethane elastomer which comprises reacting, in the absence of a blowing agent, an organic polyisocyanate with an organic compound having at least two Zerewitinoff active hydrogen atoms in a ratio of from 1.0 to 1.2 equivalents of isocyanate groups per equivalent of active hydrogen atoms in the presence of a catalytically effective amount of a co-catalyst composition comprising an organo-mercuric compound and an alkali metal carboxylic acid salt in a weight ratio of from 1 to 5 parts organo-mercuric compound per part of alkali metal carboxylic acid salt.

2. The process of claim 1 wherein the total amount of catalyst is from about 0.15 to about 1.00 parts by weight per 100 parts of active hydrogen atom containing compound.

3. The process of claim 2 wherein the alkali metal carboxylic acid salt is potassium 2-ethyl hexanoate.

4. The process of claim 3 wherein the organo-mercuric compound is a phenyl mercuric carboxylate.

5. The process of claim 4 wherein the organic polyisocyanate is crude methylene diphenyl diisocyanate.

6. The process of claim 5 wherein the ratio of isocyanate groups of the crude methylene diphenyl diisocyanate to the hydroxyl groups of the polyether polyol is from about 1.0:1.0 to about 1.2:1.0.

* * * * *